Figure 1:
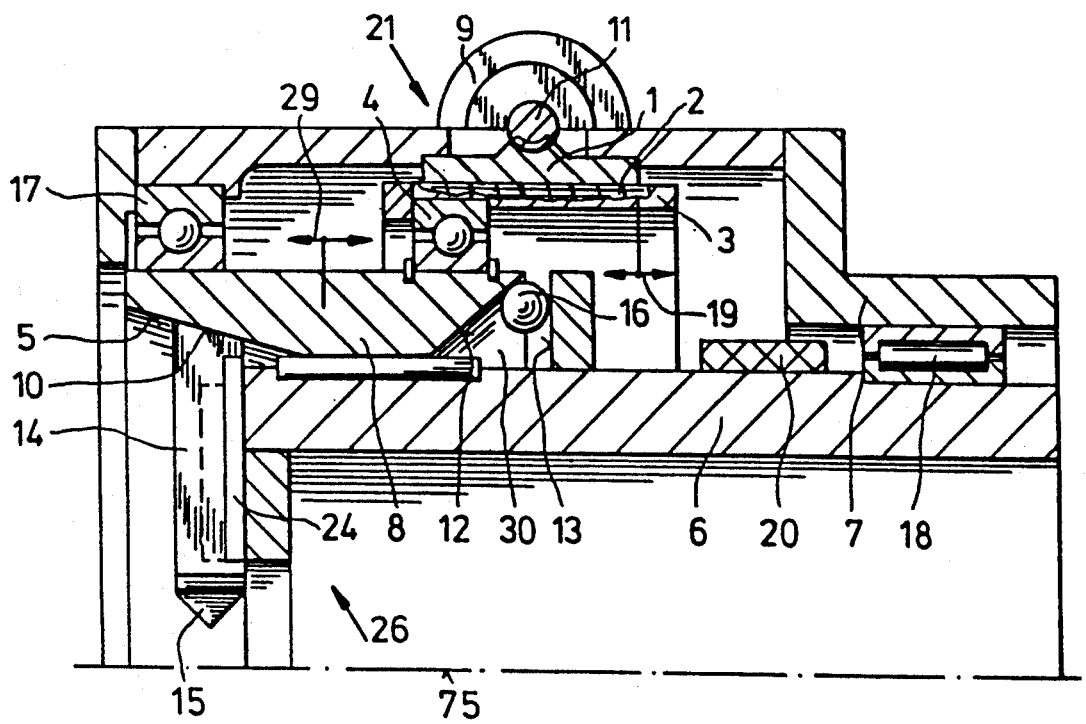

United States Patent [19]
Glomb et al.

[11] Patent Number: 5,230,266
[45] Date of Patent: Jul. 27, 1993

[54] ROTARY-DRIVEN TOOL SPINDLE

[75] Inventors: Reiner Glomb, Velbert; Peter Maresch; Ralf Wagner, both of Solingen, all of Fed. Rep. of Germany

[73] Assignee: Th. Kieserling & Albrecht, GmbH & Co., Solingen, Fed. Rep. of Germany

[21] Appl. No.: 776,338

[22] Filed: Jan. 27, 1992

[30] Foreign Application Priority Data
Jun. 15, 1989 [FR] France .................. 89110865

[51] Int. Cl.⁵ .................. B23B 21/00; B23B 29/034; B23Q 11/00
[52] U.S. Cl. .................. 82/130; 82/131
[58] Field of Search .................. 82/1.2, 1.4, 130, 131, 82/137, 138, 147, 155, 903; 408/158, 161, 168

[56] References Cited
U.S. PATENT DOCUMENTS

| | | | |
|---|---|---|---|
| 2,490,397 | 12/1949 | Aked | 408/168 |
| 2,680,390 | 6/1954 | Chapman | 408/168 |
| 3,542,697 | 10/1974 | Striegl | 82/130 |
| 4,408,472 | 10/1983 | Azarevich et al. | 82/130 |
| 4,607,549 | 8/1986 | Krempel | 82/1.2 |
| 4,620,464 | 11/1986 | Vasilchenko | 82/1.2 |

FOREIGN PATENT DOCUMENTS
3000055 8/1981 Fed. Rep. of Germany .

Primary Examiner—William E. Terrell
Attorney, Agent, or Firm—Horst M. Kasper

[57] ABSTRACT

A rotary driven spindle (6) comprises sliders (14, 64) arranged on its front face, which can be adjusted radially as the spindle (6) rotates. To this end, an adjustment mechanism (21) comprises a device component (8) which rotates with the spindle and which can be moved relative to the spindle in order to adjust the slider (14). The radial centrifugal, frictional and working forces transmitted to the bearing housing (7) by the adjustment mechanism during adjustment of the slider (14) are compensated to a controllable extent by compensation of the centrifugal forces directly between the spindle and the device component (8). The compensation is effected by means of centrifugal weights (16, 66), the centrifugal force of which is deflected into axial forces. In one embodiment, the centrifugal weights (16, 66) penetrate a gap (12, 13) which tapers outward between two front faces (12, 13) of the component and the spindle. The centrifugal forces are converted to axial forces at the inclined surfaces (12, 13) which form the gap. The centrifugal force compensation is preferably arranged in the enclosed region between the bearings (17, 18) of the spindle (6).

15 Claims, 3 Drawing Sheets

K282

K282

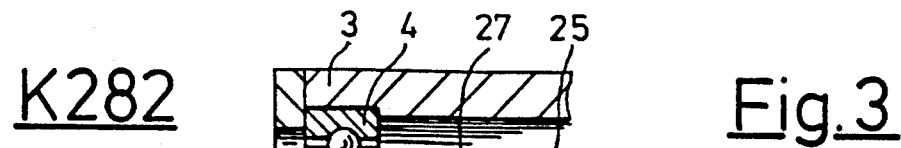
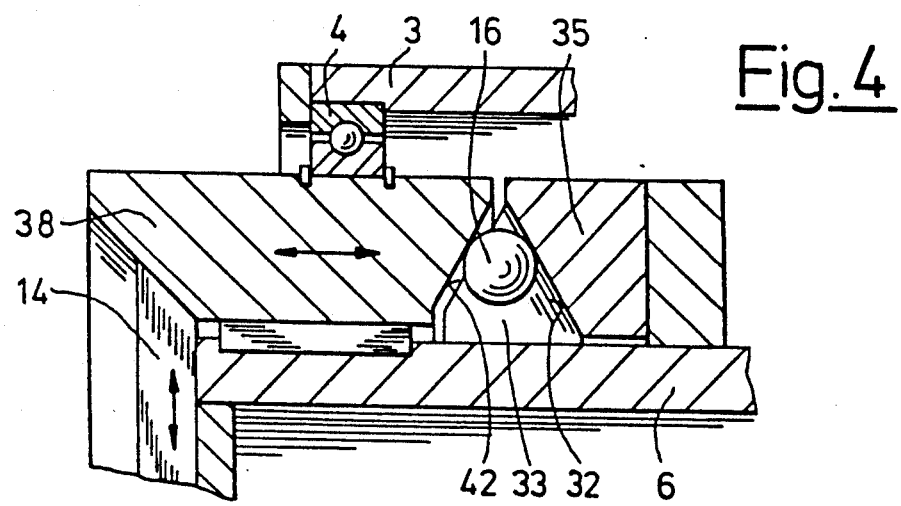
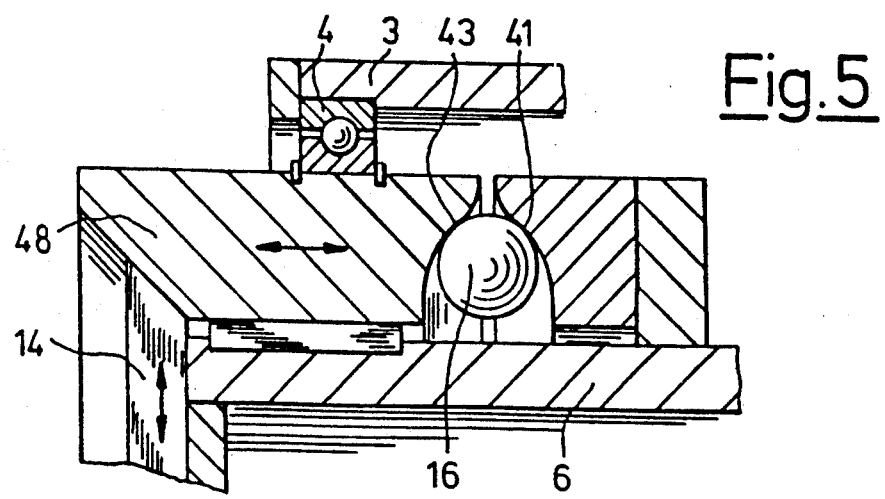

K282 Fig. 6
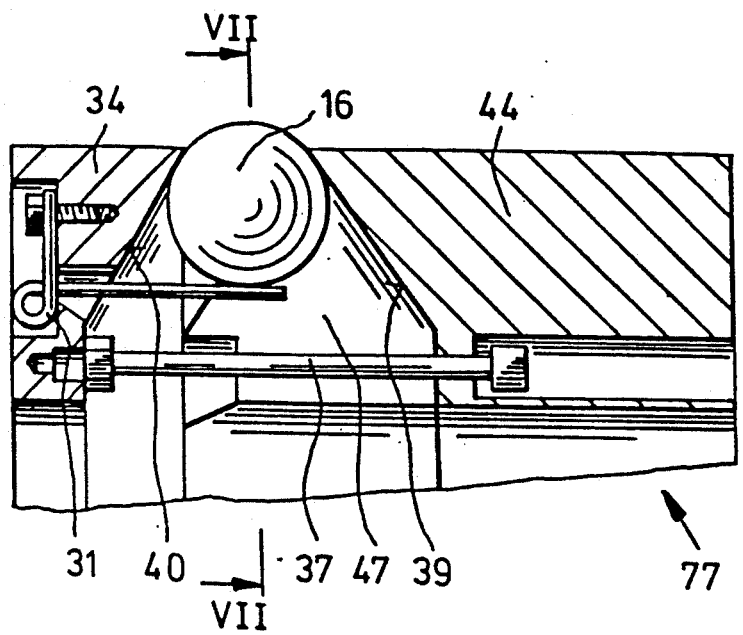
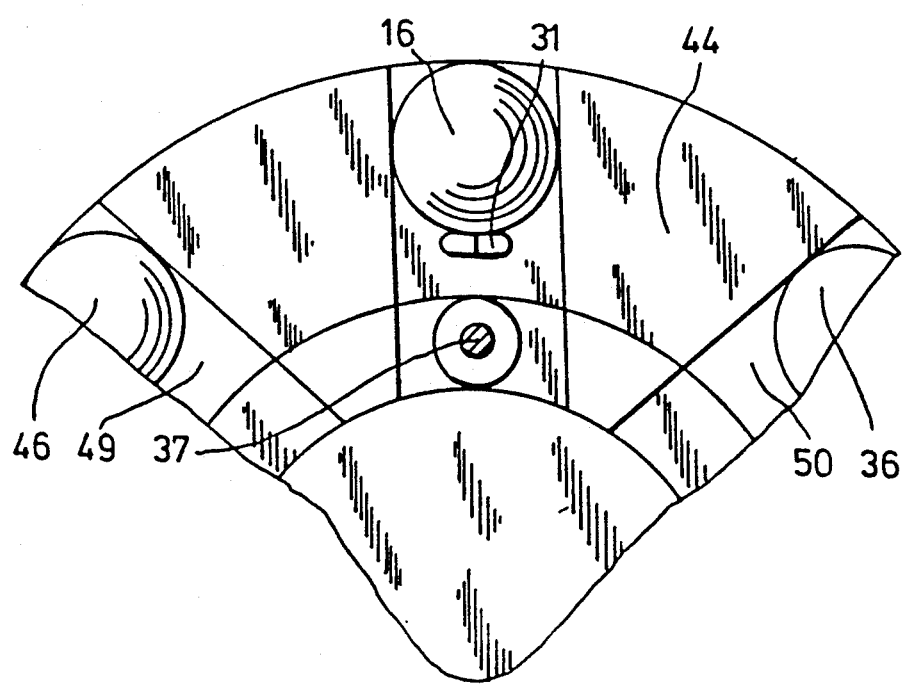
Fig. 7

ROTARY-DRIVEN TOOL SPINDLE

The invention relates to a rotary driven spindle according to the preamble of patent claim 1.

Such spindles, which in most cases are formed as hollow spindles, are employed in connection with milling machines, tapping machines or screw cutting machines, turning machines or similar machines, where a tool or a similar device is to be radially adjusted at a spindle relative to the rotation axis of the spindle during the rotation of the spindle. This is routinely performed via a force deflection of the substantially radial forces of the slider into an axial force, which is performed via device component, rotating with the spindle and movable relative to the spindle by way of an adjustment mechanism, which adjustment mechanism moves the device component relative to the spindle.

A spindle with a cutter head is known from the German Printed Patent Document DE-OS 30 00 055, where metal cutting work is performed on round rods with this cutter head. The spindle is supported in a movable bearing housing in roller bearings. The spindle supports an axially slidable device component, where the axial motion of the device component is controlled from the stationary bearing housing. Two cutters are furnished at the front face cutter head of this spindle, where the two cutters can be synchronously adjusted in radial direction by a central adjustment mechanism. The device component is formed as a bush inserted into the spindle, where the axial motion of the bush is kinematically connected via gear wheels to the radial motion of the sliders.

Axial forces are transmitted by the force deflection into the spindle and into the device component for sliding the slider. These axial forces load the spindle, the spindle bearing, the device component and the adjustment drive for the device component or, respectively, for the slider with the tool.

It is an object of the invention to compensate the forces, clamping and fastening the device component and the spindle relative to each other, and resulting from the deflection of centrifugal forces, working forces, and frictional forces of sliders or similar parts, under exclusion of the bearing housing.

This object is achieved according to the invention by characterizing features of claim 1. For the compensation of the axial forces, which are generated by the radial support of the sliders and by their deflection within the spindle system, the compensation of the axial forces is performed by centrifugal weights. The centrifugal forces of the centrifugal weights and of the sliders increase and decrease parallel to the rotation speed. The centrifugal forces are deflected in an axial direction both in the centrifugal weights as well as in the sliders and in fact such that the centrifugal forces compensate substantially. The force direction of the axial forces out of the two forces are oppositely directed. The centrifugal compensation of the axial forces by centrifugal force occurs within the unit comprising the spindle and the device component without an entry of substantial parts of the axial forces into the spindle bearing or into the adjustment mechanism. The load of the spindle bearings is thus substantially decreased by the invention construction.

The embodiment of the invention according to claims 2 and 3 is preferred, since this embodiment can most easily be incorporated into existing spindle systems because of its construction technological advantages. The axial forces, which are generated by a force deflection of the slider centrifugal forces at an inclined surface between the slider or the sliders and the device component, can advantageously be compensated by an inclined surface or by a pair of inclined surfaces and a centrifugal weight. The inclined surfaces for the sliders and the centrifugal weights have advantageously the same or a similar inclination, but are, however, formed with an opposite sign.

The centrifugal weights are disposed in an outwardly tapering gap and press the gap walls apart from each other. Thus, the radially directed centrifugal force of the centrifugal weights is transformed into an axial force.

In a further embodiment of the invention, balls or rollers, known from the rolling bearing industry, can be employed without problems according to claim 4 as centrifugal weights. The round centrifugal weights are movably supported in pockets in a cage, where the cage surrounds the hollow shaft and/or the device component like a ring. The pockets are closed radially in outward direction by an inclined surface, such that the balls attempt during rotation along the inclined surfaces to pass to the outside. The thus in principle associated axial motion of the inclined surfaces, forming the gap, is prevented by a front face at the spindle or at the device component. The force required for the axial support of the centrifugal weights compensates the axial force entered by the slider or by the sliders into the spindle.

The gap is changed by the shifting of the device component for the radial adjustment of the sliders, where the centrifugal weights are pressed into the gap upon rotation of the spindle. If the sliders are adjusted in a radially inward direction, then the inclined surface can be selected for the supporting of the centrifugal weight such that the gap is increased and the centrifugal weight migrates outwardly. This is an advantageous embodiment, because in most cases the rotation speed of the spindle is increased with inwardly adjusted sliders in order to be able to machine a workpiece at the inner end of the slider with the same peripheral speed. Thus, the degree of compensation of the axial forces, which brace and fasten the spindle and the device component, can no only be varied by dimensioning the centrifugal weights and by changing the inclination of the inclined surfaces, but also by the radius on which the centrifugal weights are maintained in the gap present for the centrifugal weights during the rotation.

As an alternative to the embodiment of the invention where centrifugal weights penetrate into a gap according to claim 5, the mounting of the centrifugal weights can also be provided at the free arm of one or several angle levers. In this case, the lever arm with the centrifugal weights is supported such that it extends substantially in axial direction of the spindle axis. The second lever arm rests in a plane perpendicular to the spindle axis and rests at this plane or at the device component supported at the perpendicular cross plane, which device component supports the sliders. The hinging of the angle lever can be performed both at the spindle as well as at the device component.

In most cases it is desired to adjust the device component or, respectively, the sliders during the operation of the spindle, according to the language of claims 6 and 7. The invention opens the possibility to relieve also the adjustment drive for the device component from the axial forces and thus to render the adjustment smoother and better running and to provide thereby a preciser control. The device component no longer needs to be adjusted relative to the axial forces generated by the slider.

The embodiment of the invention, set forth in claim 8, serves for facilitating an easier mounting and also for the operating safety of the spindle. The means for the compensation of the axial forces can be placed in a premounted state onto the spindle, after the individual centrifugal weights are enclosed in the pockets provided for this purpose. The entering of the centrifugal weights can be performed away from the spindle, for example, with an auxiliary device. The two rings, which surround the device group, can also be formed by other machine elements. The device component to be relieved can itself be formed for example, as one of the two rings. The device component and a second ring, especially provided for the compensation of the axial forces by centrifugal force, are then mounted together as a device group at the spindle. One or several locking bars prevent that the two rings can diverge and that the centrifugal weights can fall out. The locking bars are preferably formed as a closure for the pockets with the centrifugal weights. The bolting thus prevents both the centrifugal weights from falling out of the device group for the compensation of the axial forces by centrifugal force in a rest state, for example, during mounting, as well as a further diverging of the rings of the device group during the rotation of the spindle.

According to a preferred embodiment of the invention as stated in claim 9, the centrifugal weights are brought into a working position in each case by at least one spring. This step serves for the unequivocally, definite positioning of the centrifugal weights in the rest position of the spindle and for the prevention of any flight motion of the centrifugal weights, possibly during the start of the spindle.

The embodiment of the invention according to claim 10 is provided in order to assure a problem-free functioning of the compensation of the axial forces by centrifugal force and, in particular, in order to prevent interferences by dirt. According to experience, dirt accumulates at the longitudinal end of the device component at which the sliders are disposed. If the dirt would pass into the means for the compensation of the axial forces by centrifugal force, the dirt could interfere with the functioning of the means. The spatial separation alone of the compensation of the axial forces by centrifugal forces from the sliders obviates and precludes a soiling or even a damaging of the centrifugal-force compensation. The centrifugal-force compensation enjoys without further steps the protection of this encapsulation, based on the disposition of the means for the compensation of the axial forces by centrifugal force in the region of the device component disposed remote to the sliders, where the device component has to be encapsulated anyhow for a reliable sliding of the device component.

Figure 2:
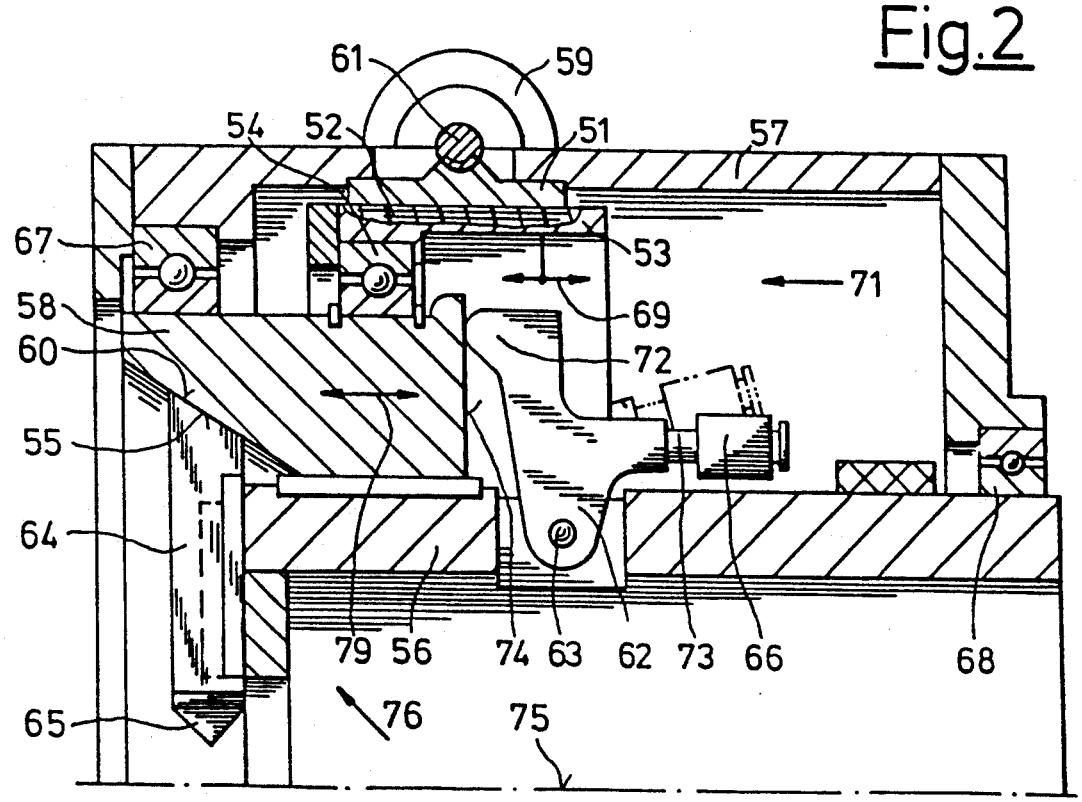

The invention is illustrated in more detail by way of the drawing and there is shown in FIG. 1: a rotary driven spindle with compensation of the axial forces by centrifugal force;

FIG. 2: another embodiment of the spindle with compensation of the axial forces by centrifugal force;

FIGS. 3, 4 and 5: in each case, an alternative embodiment of the compensation of the axial forces by centrifugal force;

FIG. 6: a means for the compensation of the axial forces by centrifugal force as a separate device group;

FIG. 7: a section through FIG. 6 according to section line VII—VII.

FIG. 1 shows a rotary-driven spindle 6, where the spindle 6 is received with spindle bearings 17, 18, in a bearing housing 7, a device component 8 which is formed slidable in axial direction relative to the spindle 6, a plurality of sliders 14 disposed around the rotation axis 75 of the spindle 6 like a star, a cutter head 26 disposed on the front side of the spindle 6, an adjustment mechanism 21 for the axial sliding of the device component 8, and a driving belt 20 which puts the spindle into rotation.

The slider 14 is shifted in radial direction relative to the spindle 6 by an axial shifting of the device component 8 formed as a tapered sleeve. This shifting is performed with the aid of a servo motor 9, where the servo motor 9 drives with a worm 11 a worm wheel 1 rotatably supported in a bearing housing 7. The rotary motion of the worm wheel is transferred as a pure axial motion onto a thrust bushing 3 via a thread 2. The thrust bushing 3 is captures with a groove, extending over its total inner circumference, a thrust bearing 4, where the inner annular bearing race of the thrust bearing 4 rotates with the spindle and the device component 8. The thrust bushing 3 and the outer annular bearing race of the thrust bearing 4 are supported fixed against rotation in the housing 7, however, the thrust bushing 3 and the other annular bearing race of the thrust bearing 4 can be shifted in axial direction with the device component 8. As soon as the servo motor rotates the worm 11, the device component 8 shifts in axial direction.

The device component 8 exhibits at the intake side an inner inclined surface 5, where the slider 14 is supported in radial direction at the inner inclined surface 5. The slider 14 and the device component 8 are kinematically connected to each other by a correspondingly inclined surface 10 at the slider 14. The sliders 14 are guided in radial direction in guides 24 at the front side at the cutter head 26. Upon rotation of the spindle 6, the sliders 14 press radially against the inclined surface 5 at the device component 8. The radial force of the slider or, respectively, of the sliders is transformed into an axial force at the inclined surface 5 corresponding to the slope, where the axial force axially braces the spindle 6 and the device component 8 relative to each other.

The oppositely disposed front side of the device component 8 is formed as a inclined surface 12, where the inclined surface forms in cooperation with a front face 13 a gap at the spindle 6, where a series of balls 16 in pockets 30 are furnished in the gap. The balls 16 penetrate during rotation of the spindle 6 outwardly into the tapering gap made up of the inclined surfaces 12, 13 of the front faces and the balls 16 thus compensate the axial force, with which the slider 14 axially braces the spindle and the device component.

The axial forces thus do not have to be transferred via the spindle bearing 17, 18 nor via the thrust bearing 4. The adjustment drive can service in a smooth-running and precise way for the desired positioning of the slider 14 or, respectively, of the cutters 15 furnished at the inwardly directed ends of the slider 14.

The embodiment illustrated in FIG. 2 is the same as the embodiment illustrated in FIG. 1 with the exception of the compensation of the axial forces by centrifugal force. The embodiment of FIG. 2 comprises a bearing housing 57, where a spindle 56 is received in spindle bearings 67, 68 in the bearing housing 57. A device component 58, formed as a tapered sleeve is supported slidable in axial direction on the spindle 56, however, the tapered sleeve is secured against rotation relative to the spindle 56. The device component 58 exhibits on the inner front side an inclined surface 60, where a slider 64 is radially supported at the inclined surface 60 and where the slider 64 is guided in radial direction at the cutter head 76. An angle lever 62 is illustrated at the oppositely disposed front face 74 of the device component 58, where the angle lever 62 is attached at the spindle 56 with a hinge 63. One of the lever arms 72 of the angle lever 62, extending in radial direction, is resting with its free end at the front face 74 and a second lever arm 73 of the angle lever 62 extends parallel to the rotation axis 75 of the spindle. The lever arm 73 carries a centrifugal weight 66, which exerts upon rotation of the spindle 56 an axial force on the rearward front face of the device component 58 via the levers arm 72. A series of angle levers 62 is provided and distributed over the circumference, where the angle lever 62 assure a symmetrical distribution of the axial forces to be compensated. The lever arm of the centrifugal weight 66 can be changed in the length value. The FIGS. 3, 4 and 5 illustrate a compensation of the axial forces by centrifugal force similar to the embodiment illustrated in FIG. 1, where the spindle 6 supports a device component 28, 38, 48 at its end on the inner front side. The device components and the sliders supported at the device components are functionally identical to the device component 58 and the slider 64 in FIG. 2. The same holds for the adjustment mechanism with thrust bushing 3, which are only partially illustrated here. An annular edge 25 is placed around the spindle 16 opposite to the rearward front face 27 of the device component 28, according to FIG. 3. The annular cage 25 carries uniformly distributed over its circumference a series of pockets 23, where balls 16 are supported in the pockets 23. The pockets 23 exhibit an inclined surface 22, where the inclined surface 22 forms in cooperation with a front face 27 an outwardly tapering gap, at the device component 28, where the ball 16 penetrates into the tapering gap upon rotation of the spindle 6 based on its centrifugal force. The front face 27 is planar, while the inclined surface 22 is formed exclusively in the cage 25.

According to FIG. 4, both the rearward front face of the device component 38 is furnished with an inclined surface 42, as well as each of the pockets 33, where only one of the pockets 33 is illustrated, is furnished with an inclined surface 32, wherein the complementing inclined surfaces 32, 42 form an outwardly tapering gap, where the ball 16 presses into the slot upon rotation of the spindle 6. This embodiment with, in each case, an inclined surface on both sides of the ball is associated with the advantage that the angular region of the tapering gap can be varied over a wide region.

A further embodiment of the invention is illustrated in FIG. 5, showing how the axial forces, which are derived from the compensation of the axial forces by centrifugal force can be varied by a change in the slope of the inclinations to sloped curves 41, 43. The measure of the compensation of the axial forces can be increased or reduced based on a suitable selection of the curves. This arrangement of the axial forces is performed dependent on the axial position of the device component 48.

The compensation of the axial forces by centrifugal force illustrated in FIGS. 6 and 7 corresponds in its mode of operation to the embodiment illustrated in FIG. 4. The characteristic feature of the embodiment of FIG. 4 rests in that the compensation of the axial forces by centrifugal force is slid onto the spindle as a completely assembled device group 77, wherein an equipping with the balls 16, 36 46 occurs already before mounting the device group onto the spindle. The balls are prevented from leaving the pockets 47, 49, 50 by locking the two rings 34, 44 with several screws formed as locking bars 37. The locking bars 37 prevent this in a two-fold way. First, the locking bars 37 prevent a diverging of the rings 34, 44 to such an excessive extent that the balls could eject outwardly out of the pockets, and, secondly, the path is blocked inwardly directly by the locking bars. In addition, a spring 31, which is attached at one of the 34, assures that the balls are always pressed outwardly and come to rest at the inclined surfaces 39, 40 at the rings 34, 44. This achieves that the centrifugal weights are not flying freely in their pockets 47, 49, 50 in any position of the device component in the starting phase or shortly before the stoppage of the spindle. A particular feature of the invention can be found in that the compensation of the axial forces exerted indirectly by the sliders onto the device component, is not performed in the, without question, very narrow region of the slider at the cutter head side of the spindle, where all parts are subjected to a large extent to soiling and wear, but remote from the region of the slider at the cutter head side in an encapsulated region between the bearings of the spindle in the bearing housing.

We claim:

1. Rotary driven machining tool with speed-dependent adjustable axial load, comprising the following features:

a spindle (6), a bearing housing (7), bearings (17, 18) wherein the spindle is rotatingly supported in the bearing housing (7), a device component (8, 58) rotating with the spindle and means for axially sliding said device component (8, 58) relative to the spindle, at least one tool slider (14, 64), supported and guided at the spindle for rotation therewith and movable radially to the spindle, where the slider (14, 64) is kinematically connected to the device component (8, 58), for radial adjustment by axial sliding of said device component (8, 58), such that radial forces of said slider generate axial forces onto said device component, centrifugal weights (16, 66) and means for deflecting centrifugal forces of the centrifugal weights (16, 66), acting in a radial direction into an axial direction onto said device component to oppose said axial forces from said slider (14, 64), where a compensation of the axial forces onto the device component (8, 58) is furnished by the centrifugal forces.

2. Rotary driven tool according to claim 1, characterized by the following feature:

the kinematic connection of the device component and of the slider is comprised of an inclined surface (5, 10) at the device component and at the slider, wherein the slider (14), movably guided in radial direction at the spindle, is radially supported at the inclined surface (5) at the device component (8).

3. Rotary driven tool according to claim 1, characterized by the following feature:

the deflection of the centrifugal forces of the centrifugal weights (16, 66) is performed by an inclined surface (12).

4. Rotary driven tool according to claim 3, characterized by the following feature:
round centrifugal weights (16) are supported at the inclined surface (22) and at a front face.

5. Rotary driven tool according to claim 1, characterized by the following feature:
the centrifugal weights (66) are supported at least at one angle lever (62), where one arm (72) of the angle lever (62) is resting at a front face (74), and wherein the hinge (63) of the angle lever (62) is attached at the spindle (56) or at the device component (58).

6. Rotary driven tool according to claim 1, characterized by the following feature:
the device component (8) is connected at an adjustment mechanism (21), which moves the device component (8) in an axial direction relative to the spindle (6).

7. Rotary driven tool according to claim 6, characterized by the following feature:
the adjustment mechanism is actuated from a resting bearing housing.

8. Rotary driven tool according to claim 1, wherein the means for the compensation of the axial forces by the centrifugal-force are joined to a device group (77),
the device group comprises two rings (34, 44), which enclose in the mounted state the spindle (6) and which are pressed apart in axial direction by the centrifugal weights (16), and wherein
the rings (34, 44) are locked as a device group.

9. Rotary driven tool according to claim 8, which exhibits the following feature:
the centrifugal weights (16) are pressed outwardly by springs (31) in a radial direction relative to the rotation axis of the spindle (6).

10. Rotating spindle according to claim 8, which exhibits the following feature:
the means for the compensation of the axial forces by the centrifugal force are disposed at the longitudinal end of the device component (8) disposed opposite to the sliders (14).

11. Rotary driven tool according to claim 6, characterized by the following feature:
the centrifugal weights (66) are supported at least at one angle lever (62), where one arm (72) of the angle lever (62) is resting at a front face (74).

12. Rotary driven tool according to claim 6, characterized by the following feature:
the deflection of the centrifugal forces of the centrifugal weights (16, 66) is performed by an inclined surface (12).

13. Rotary driven tool according to claim 5, characterized by the following feature:
the deflection of the centrifugal forces of the centrifugal weights (16, 66) is performed by an inclined surface (12).

14. Rotary driven tool according to claim 5, characterized by the following features:
the means for the compensation of the axial forces by the centrifugal-force are assembled to a device group (77), the device group comprises two rings (34, 44), which enclose in the mounted state the spindle (6) and which are pressed apart in axial direction by a centrifugal weights (16), the rings (34, 44) are locked as a device group.

15. Rotary driven tool according to claim 3, characterized by the following features:
the means for the compensation of the axial forces by the centrifugal-force are assembled to a device group (77), the device group comprises two rings (34, 44), which enclose in the mounted state the spindle (6) and which are pressed apart in axial direction by the centrifugal weights (16), the rings (34, 44) are locked as a device group.

* * * * *